(12) United States Patent
Randall et al.

(10) Patent No.: US 6,440,300 B1
(45) Date of Patent: Aug. 27, 2002

(54) WATER TREATMENT SYSTEM FOR SWIMMING POOL WATER

(76) Inventors: Michael Randall, 4982 Vinehill Rd., Deephaven, MN (US) 55331; Eric Granheim, 15705 - 48th Ave. North, Plymouth, MN (US) 55446; James M. Vossen, 20801 Fern Dr., Lakeville, MN (US) 55044

(*) Notice: Subject to any disclaimer, the term of this patent is extended or adjusted under 35 U.S.C. 154(b) by 0 days.

(21) Appl. No.: 09/906,223

(22) Filed: Jul. 16, 2001

(51) Int. Cl.⁷ .......... E04H 4/16; B01D 21/00; C02F 1/64
(52) U.S. Cl. .......... 210/169; 210/198.1; 210/202; 210/206; 210/259; 210/416.2; 210/722; 210/912; 423/140
(58) Field of Search .......... 210/169, 198.1, 210/201, 203, 205, 209, 252, 259, 416.2, 912, 721, 728, 754–756, 760, 202, 206, 207, 722; 423/140

(56) References Cited

U.S. PATENT DOCUMENTS

| | | | |
|---|---|---|---|
| 3,540,592 A | | 11/1970 | Derreumaux |
| 3,552,568 A | * | 1/1971 | Wade |
| 3,650,405 A | * | 3/1972 | Morrison |
| 3,762,550 A | | 10/1973 | Jarr et al. |
| 4,043,913 A | | 8/1977 | Hintermeister |
| 4,253,950 A | * | 3/1981 | Wojtowicz |
| 4,684,471 A | | 8/1987 | Manojlovic |
| 4,839,057 A | | 6/1989 | White |
| 4,879,027 A | * | 11/1989 | Sanders |
| 5,007,994 A | | 4/1991 | Snee |
| 5,100,542 A | * | 3/1992 | Landman et al. |
| 5,236,595 A | * | 8/1993 | Wang et al. |
| 5,370,857 A | * | 12/1994 | Deininger |
| 5,500,131 A | | 3/1996 | Metz |
| 5,700,377 A | * | 12/1997 | Cox |
| 5,766,456 A | | 6/1998 | Denkewicz, Jr. et al. |
| 5,772,896 A | * | 6/1998 | Denkewicz, Jr. et al. |
| 5,849,199 A | * | 12/1998 | Jack |
| 5,858,246 A | | 1/1999 | Rafter et al. |
| 5,897,784 A | | 4/1999 | Mills |
| 6,146,539 A | | 11/2000 | Mills |
| 6,190,547 B1 | | 2/2001 | King et al. |
| 6,284,144 B1 | * | 9/2001 | Itzhak |

* cited by examiner

*Primary Examiner*—David A. Simmons
*Assistant Examiner*—Fred Prince
(74) *Attorney, Agent, or Firm*—Haugen Law Firm PLLP

(57) ABSTRACT

A swimming pool water treatment system for removing iron from feed water, with the system including a large storage/reaction vessel to which a branch injection/filtration circuit is coupled. An alkali metal hypochlorite is injected into water flowing through the injection/filtration circuit and delivered to the storage/reaction vessel to permit precipitation of the iron oxide. A bank of parallelly coupled filters are provided in the branch filtration circuit upstream from the hypochlorite injection site for removal of insoluble iron precipitated from the treated water within the storage/reaction vessel. The branch injection/filtration circuit further incorporates an ozone injector valve where a flow of ozone is continuously introduced to water flowing through the branch injection/filtration circuit. The storage/reaction vessel is sized sufficiently large so as to permit an adequate contact dwell time for formation of the insoluble iron precipitate.

7 Claims, 1 Drawing Sheet

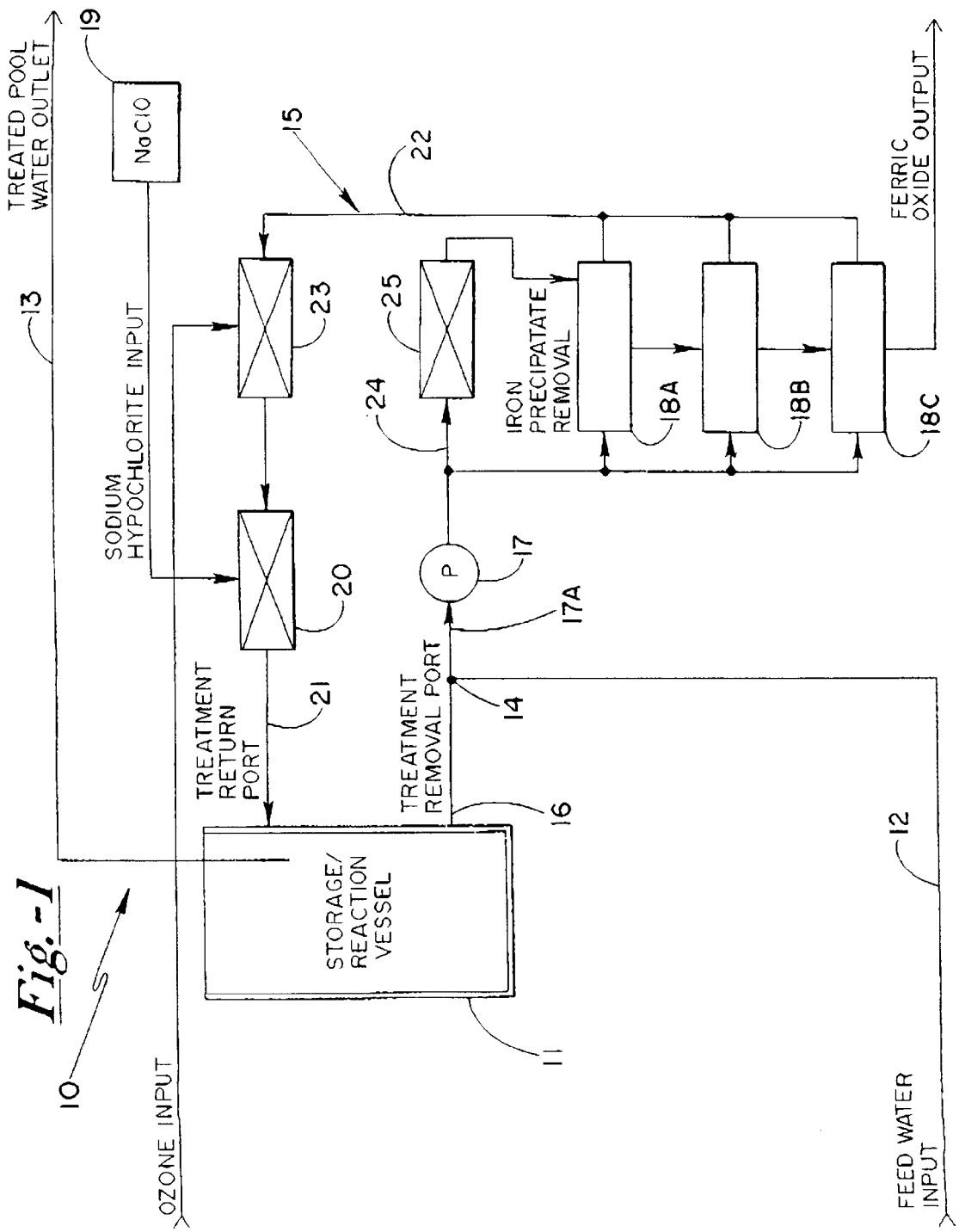

WATER TREATMENT SYSTEM FOR SWIMMING POOL WATER

BACKGROUND OF THE INVENTION

The present invention relates generally to an improved swimming pool water treatment system, and more particularly to such a system which is designed to remove undesired quantities of iron from a supply of incoming water. In the swimming pool environment, dissolved iron creates a problem due to its tendency to precipitate from the solution and form a deposit on the walls forming the liner of the pool, such as a normally plastered, painted and/or vinyl-lined pools. For aesthetic purposes, the deposits are removed from time to time at considerable expense, while at the same time causing deterioration of the lining, particularly the sealing grout between adjoining tile pieces for example.

Swimming pools are widely used throughout the world as the hub of activity including sporting activity as well as aerobic and other exercises. Athletic and other aquatic events are held in swimming pool environments, since pools permit an extension of an otherwise shortened swimming activity. Pools are commonly used in homes as well as in municipal installations including municipal parks, gardens, and the like.

Underground water forms all or part of the source of water used for pool purposes. In many regions of the United States, ground water frequently contains modest to large quantities of dissolved iron. While the presence of iron does not pose an immediate health threat, it does detract from the aesthetic appearance of a swimming pool. The iron, in ionic or iron complex form, precipitates onto the walls of the pool, thereby forming an undesirable and unsightly reddish-brown stain. This stain is necessarily removed from time to time by acid treatment coupled with high pressure or other treatment operations. In any event, cleaning operations tend to cause deterioration of the surface of the pool liner, whether the liner is fabricated from the traditional ceramic tile, or fabricated of a plastic resinous material. In ceramic tile installations, the grout which is interposed or introduced as a seal between adjacent tile pieces is frequently damaged and/or eliminated under contact from the acid cleaners and/or high pressure water sources.

Undesirable quantities of ionic and/or complex ferric or ferrous iron may be removed through chemical treatment, including such treatment techniques involving precipitation/filtration as well as ion exchange. One commonly utilized technique is that of ion exchange wherein one or more resin columns are placed in series and/or parallel with an incoming source of feed water, with the output from the exchange column being delivered directly to the pool. The disadvantage of this system is the added time required through pressure drop occasioned by the water passing through the exchange columns as well as column replacement. Another technique is to interpose an iron precipitating system directly within the line, with certain quantities of the precipitate being removed through conventional filtration, with a hypochlorite, particularly sodium hypochlorite normally being utilized as the precipitate-initiator. There are two disadvantages to this system, one being the necessity of contacting the incoming water with sufficient hypochlorite so as to cause rapid precipitation of iron oxide, the other being the added time required due to pressure drop and resulting decrease in flow rate. Needless to say, both of these systems suffer from the disadvantage of requiring rather constant attention with skilled personnel, with the ion exchange columns requiring frequent interchange and replenishment.

SUMMARY OF THE INVENTION

In accordance with the system of the present invention, a storage/reaction vessel is employed for retaining relatively large volumes of water, for example, a volume capacity which is typically about 100 times the per-minute volumetric input of the water source to the treatment system. For most residential applications, the volumetric input is approximately 7 gallons per minute. In order to preserve this volumetric flow, the typical residential system for the present invention utilizes a storage vessel having the predetermined capacity set forth above or about 500 gallons. The throughput to the storage vessel remains constant, that is, equivalent to that of the incoming stream with the output being directed directly to the pool. A branch injection circuit is operatively coupled to the storage vessel through upstream circuit removal and downstream circuit return ports. A pump is interposed in the line for continuously maintaining a flow through the branch injection circuit where both hypochlorite injection and iron precipitate removal steps are accomplished. In order to provide sufficient contact time for the iron precipitation reaction to occur, the volume of the storage vessel is at least about 50 times, and preferably about 100 times the per-minute volume input of raw iron containing water to the system. This ratio provides average contact time of 50 minutes to 100 minutes in the vessel, which is generally sufficient for effective removal of the ferric ion component present in the incoming water. Ozone may be utilized in the system as an added treatment step.

The hypochlorite is metered into the system through a metered injection site, with a controlled quantity being added during flow through the branch injection circuit. In order to maintain a hypochlorite concentration of sufficient magnitude, the flow rate through the branch injection circuit exceeds that of the input/output by a magnitude of at least about 8:1. With this ratio, a sufficient quantity of hypochlorite is injected into the water flow so that effective removal can be achieved in the storage vessel during the allotted contact time. The filtration mechanism typically employs sand filters which are effective in removing the gelatinous iron oxide precipitate, with the precipitate being, of course, totally harmless to the environment.

Therefore, it is a primary object of the present invention to provide an improved swimming pool water treatment system for removal of iron from a supply of incoming water containing undesirable quantities of dissolved iron.

It is a further object of the present invention to provide an improved swimming pool water treatment system employing a storage vessel with a branch injection circuit operatively coupled to the vessel for injection of hypochlorite into the water, and with the vessel having a volume permitting extended contact time to allow precipitation of the insoluble iron precipitate.

Other and further objects of the present invention will become apparent to those skilled in the art upon a study of the following specification, appended claims, and accompanying drawing.

IN THE DRAWING

FIG. 1 is a schematic diagram of a typical system embodying the features of the present invention, and illustrating the arrangement of components along with the steps accomplished in the treatment operation.

DESCRIPTION OF THE PREFERRED EMBODIMENT

In accordance with the preferred embodiment of the present invention, and with particular attention being directed to the drawing, the system generally designated 10 includes a storage/reaction vessel 11 having a feed water input 12 coupled thereto. A treated pool water outlet 13 is provided for removing a flow of treated water from vessel 11 at a rate substantially equal to that of the incoming flow. A branch injection/filtration circuit (hereinafter "branch injection circuit") generally designated 15 is provided, with the branch injection circuit being operatively coupled to storage/reaction vessel 11 through upstream removal port 16 and downstream return port 21. Pump 17 is used to maintain flow of treated water from vessel 11 through branch injection circuit 15, with feed water input 12 being coupled to pump inlet line 17A at junction point 14. The location of the feed water input is advantageous inasmuch as the pressure in line 17A is normally low. A plurality of iron precipitate removal filters are provided in parallel hook-up relationship, such as removal vessels 18A, 18B and 18C. The ferric ion content of the incoming feed water reacts with the hypochlorite in the storage/reaction vessel to form an iron oxide precipitate which is typically gelatinous in nature, and is effectively removed during transfer through the branch injection circuit by sand filters. The output of the iron removal vessels is directed to the hypochlorite injector valve 20 which meters a controlled quantity of an alkali metal hypochlorite into the flowing stream. A peristaltic injector pump is typically used as the injector means, although other types of injectors such as positive displacement pumps or valves may be employed as well. An aqueous solution of sodium hypochlorite is provided in vessel 19 which is coupled to the injector valve 20 for delivery to the flow. The output of valve 20 containing the appropriate quantity of sodium hypochlorite returns to storage/reaction vessel 11 through return port 21. As indicated above, contact time between the hypochlorite enriched water and incoming feed water occurs through the extended dwell time available for the water within storage/reaction vessel 11. It will be noted that the system provides for substantial hypochlorite concentration in the water flowing between the injector valve 20 and the treatment output port 21, with this significant concentration level serving to help initiate the iron precipitation reaction.

THE HYPOCHLORITE COMPONENT

Sodium hypochlorite is typically employed, although other alkali metal hypochlorites including potassium hypochlorite may be utilized. Both are commercially available, with sodium hypochlorite being commercially available in concentrations of 20 percent. In a typical residential pool-filling operation utilizing an input of raw water and thus a throughput of 7 gallons per minute (10,080 gallons per day) will utilize 2.5 gallons of 20 percent concentrated sodium hypochlorite per day. This quantity has been found sufficient for removal of iron up to at least about 10 ppm of iron.

BRANCH INJECTION CIRCUIT

The branch injection circuit is designed to operate at a flow rate which is at least about 8 times the volumetric flow rate of the incoming feed water. More desirably, a flow rate of between about 8:1 and 10:1 is desirable for maintaining the concentration of hypochlorite in the storage vessel at the desired level. Thus, in a typical application, for a volumetric input of 7 gallons per minute, a flow rate through the branch injection circuit of 60 gallons per minute is desirable, with 8 percent hypochlorite solution being employed.

The iron removal filters are preferably of the sand type, with a number of such filters being arranged in parallel coupled relationship, one to another, and sized appropriately for the particular operation. The utilization of three or more such iron filters is possible without generating undue pressure drops through the system. These filters are effective for removal of the ferric oxide precipitate which results from contact between the incoming water in the hypochlorite injected into the system.

OZONE INJECTION

In branch injection circuit 15, line 22 extending between the iron precipitate removal filters and the sodium hypochlorite injector site, a quantity of ozone is desirably injected into the line. The ozone is created from a typical electronic ozone generator, commercially available, and injected into the stream through injector valve 23. Injector valve 23 is preferably a Venturi, although other injector forms may be employed as well. It has been found desirable to inject ozone into the line prior to the introduction of additional quantities of hypochlorite.

POOL DELIVERY

In the schematic, treated pool water is indicated as being delivered directly from the storage vessel 11. For those installations where the treatment operation is at a level below that of the pool, it is appropriate to interpose a buffer storage vessel which is equipped with a pump to handle gravity output from storage vessel 11 and thence pumped directly to the pool. An intermittent pumping system similar to that of a sump-pump may be advantageously employed.

In a typical application, a water level responsive sensor is provided for delivering a signal indicating a sufficient volume of treated water has been delivered to the pool. The sensor functions to shut the system down. This shut-down is accomplished by terminating delivery of feed water to the system, and at the same time, cutting off power supplies to the pump, hyprochlorite injector, and ozone generator components.

SYSTEM BACKWASH

Following the fill operation, filters 18A, 18B and 18C undergo a backwash operation for cleaning. Because of the nature of the iron precipitate, the backwash flow rate is typically three times that of the filtration rate, with such a backwash rate achieving effective removal of the iron precipitate. This precipitate is harmless to the environment and is therefore subject to ease of disposal. Also, the treatment system of the present invention may accomplish the backwash operation by appropriate valving as at 25 employing pump 17, backwash line 24, along with appropriate valving and disconnects for the individuals filters 18A, 18B and 18C.

START-UP PHASE

In the operation of the system, the start-up phase is undertaken pursuant to the following steps. Initially, the storage/reaction vessel is filled to a volume sufficient to fill and operate the branch injection circuit. In other words, the vessel is filled to a level which will permit continuous operation of the pump, filters, and injection systems. Since the system, at start-up, lacks a sufficient quantity of water to fill the branch injection circuit 15, feed water at start-up is added directly to vessel 11 either through a separate line or, alternatively, through input line 12 with appropriate valving being utilized to direct flow in line 17A back to vessel 11.

By way of example, for a storage/reaction vessel having a capacity of 500 gallons, 150 gallons is normally sufficient to accommodate operation of a typical compatible branch injection circuit. When the incoming raw water level has reached this point, an initial charge of sodium hypochlorite is added to the partially filled vessel in order to initiate the reaction precipitating iron oxide from the solution. For most purposes, an initial charge of 8 to 12 ounces of 20 percent sodium hypochlorite has been found satisfactory. With this quantity of hypochlorite present, the initial precipitation reaction is initiated and iron removal commenced. Also, as the system continues to fill, the injector will continue to add additional hypochlorite to the charge, thereby maintaining and continuing the precipitation of ferric oxide on an ongoing basis.

It will be appreciated that these features of the invention are typical, and are disclosed for the purpose of illustration only and are not to be construed as a limitation upon the scope to which the invention is otherwise entitled.

What is claimed is:

1. In a swimming pool water treatment system for removal of iron from a supply of incoming water containing a quantity of dissolved iron, the system comprising:

(a) a storage vessel having a capacity of predetermined volume;

(b) a feed water input for receiving iron containing feed water and an output for delivering treated water therefrom, with said feed water input and said treated water delivery each being at a certain first predetermined volumetric flow rate;

(c) a branch injection/filtration circuit operatively coupled to said storage vessel through upstream removal and downstream return ports, and including pumping means for continuously maintaining a flow of water through said branch injection circuit at a certain second predetermined volumetric flow rate;

(d) said injection/filtration circuit including injector valve means for metered injection of a controlled quantity of an alkali metal hypochlorite to said treatment flow upstream from said return port;

(e) filtration means between said removal port and said injection site for removal of insoluble iron precipitated during contact dwell time within said storage vessel;

(f) the volumetric rate of said second flow exceeding that of said first flow by a magnitude of at least about 8:1 for maintaining the concentration of hypochlorite within said storage vessel, and with the predetermined volume capacity of said storage vessel being at least about 50 times the per minute volume of said first predetermined volumetric flow rate.

2. The system of claim 1 wherein the predetermined volume of said storage vessel is about 100 times the per minute volume of said first predetermined volumetric rate.

3. The system of claim 1 wherein the volume of said storage vessel exceeds the per-minute volume rate of said first flow rate by a magnitude sufficient to provide for an average contact time period of iron containing water with hypochlorite within said storage vessel of at least about 100 minutes.

4. The system of claim 1 wherein ozone is injected into the water undergoing treatment.

5. The system of claim 4 wherein ozone injector valve means are provided in said injection/filtration circuit for delivering a flow of ozone into water flowing through said branch injection/filtration circuit.

6. The system of claim 1 wherein said feed water input is coupled to said branch injection/filtration circuit between said removal port and said filtration means.

7. The system of claim 1 wherein said alkali metal hyprochlorite is sodium hypochlorite.

* * * * *